US006430053B1

(12) United States Patent
Peterson et al.

(10) Patent No.: US 6,430,053 B1
(45) Date of Patent: Aug. 6, 2002

(54) PLUGGABLE TRANSCEIVER MODULE HAVING ROTATABLE RELEASE AND REMOVAL LEVER WITH LIVING HINGE

(75) Inventors: Bruce A. Peterson, Schaumburg; Raul Medina, Chicago; Frank J. Peterson, Oak Forest, all of IL (US)

(73) Assignee: Stratos Lightwave, Chicago, IL (US)

( * ) Notice: Subject to any disclaimer, the term of this patent is extended or adjusted under 35 U.S.C. 154(b) by 0 days.

(21) Appl. No.: 10/022,704

(22) Filed: Dec. 13, 2001

(51) Int. Cl.[7] ................................................ H05K 7/00
(52) U.S. Cl. ....................... 361/728; 361/754; 361/759; 361/732; 361/740; 439/352; 439/357; 439/483; 439/609
(58) Field of Search ................................. 361/728, 725, 361/729, 732, 740, 747, 754, 759, 785, 798, 801; 439/607, 608, 609, 610, 483, 352, 357

(56) References Cited

U.S. PATENT DOCUMENTS

| 4,387,956 | A | | 6/1983 | Cline ........................ 250/96.2 |
| 4,734,049 | A | | 3/1988 | George et al. .............. 439/259 |
| 5,734,558 | A | | 3/1998 | Poplawski et al. .......... 361/752 |
| 5,820,398 | A | * | 10/1998 | Stabroth et al. ............ 439/352 |
| 5,879,173 | A | | 3/1999 | Poplawski et al. .......... 438/138 |
| 5,931,290 | A | | 8/1999 | Wehrli, III et al. ......... 200/400 |
| 6,142,828 | A | * | 11/2000 | Pepe ........................... 439/607 |
| 6,149,465 | A | * | 11/2000 | Berg et al. ................... 361/728 |
| 6,229,708 | B1 | * | 5/2001 | Corbin et al. ................ 361/725 |
| 6,231,145 | B1 | * | 5/2001 | Liu ........................... 312/223.2 |

* cited by examiner

Primary Examiner—David S. Martin
Assistant Examiner—Hung Bui
(74) Attorney, Agent, or Firm—Steven M. Evans

(57) ABSTRACT

A pluggable transceiver module having a housing with a first side and a face perpendicular to the first side, and a tab extending beyond the surface of the first side, and the tab sized to mate with a slot in a receptacle of a host device for receiving the pluggable transceiver module housing, an elongated member slidably mounted to the first side of the housing and having an internal end and an external end, a wedge on the internal end of the elongated member, wherein sliding the elongated member inward causes the wedge to slide between the tab and the slot on the receptacle and remove the tab from within the slot, thereby releasing the pluggable transceiver module from the receptacle, and a lever rotatably mounted via an axle proximate the face of the pluggable transceiver module, said axle being connected to the external end of the elongated member such that rotating the lever away from the face of the pluggable transceiver cause the rotating axle to push the elongated member inward and drive the wedge between the tab and the slot in order to release the pluggable transceiver module from the receptacle.

14 Claims, 6 Drawing Sheets

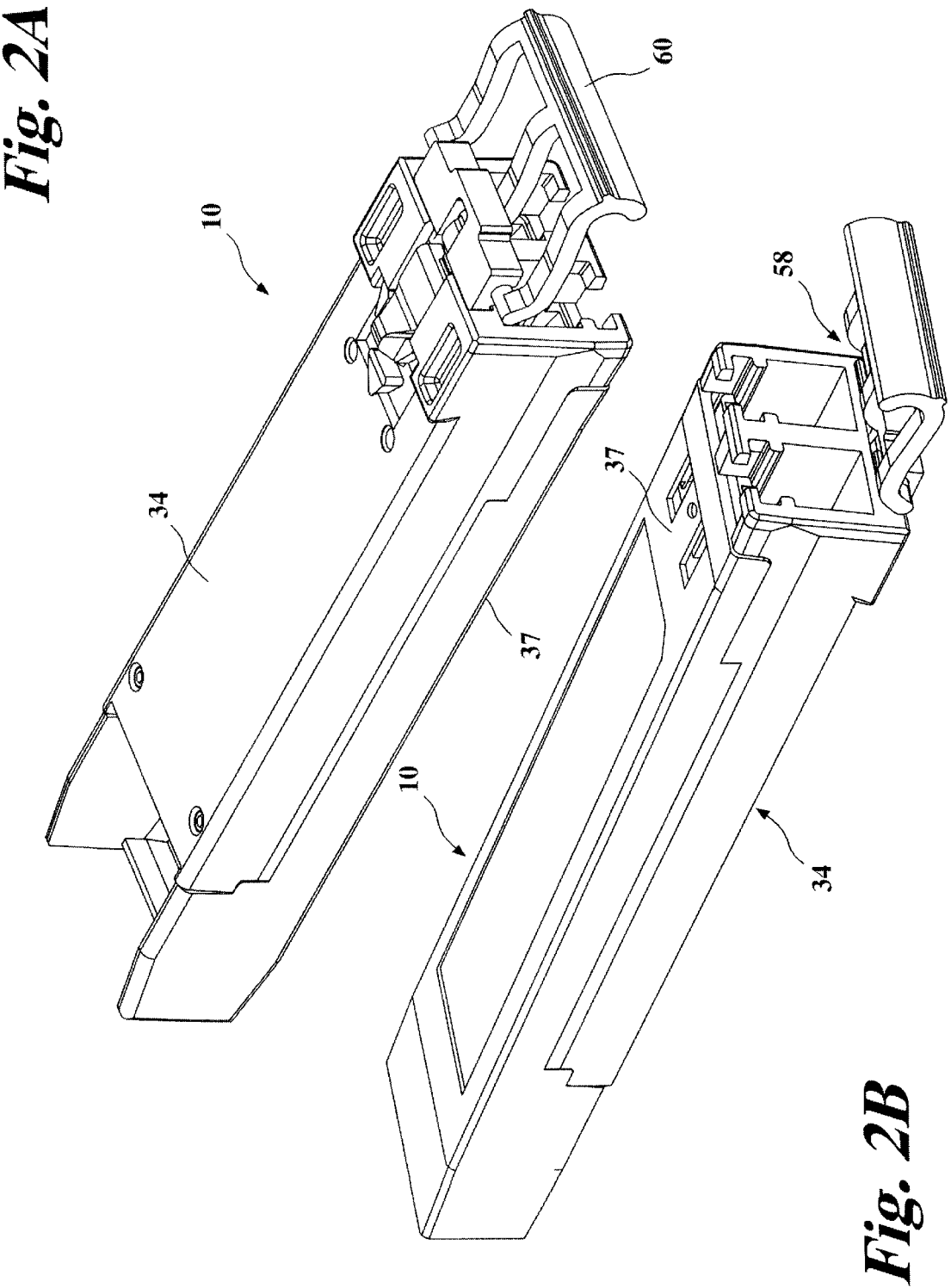

PLUGGABLE TRANSCEIVER MODULE HAVING ROTATABLE RELEASE AND REMOVAL LEVER WITH LIVING HINGE

FIELD OF THE INVENTION

The present invention relates generally to pluggable transceiver modules, and more particularly, to a pluggable transceiver module having a rotatable release and removal lever utilizing a living hinge.

BACKGROUND OF THE INVENTION

Optoelectronic transceivers are utilized to interconnect circuit cards of communication links and other electronic modules or assemblies. Various international and industry standards define the type of connectors used to interface computers to external communication devices such as modems, network interfaces, and other transceivers. A well-known type of transceiver module developed by an industry consortium and known as a Gigabit Interface Converter (GBIC) provides an interface between a computer and an Ethernet, Fibre Channel, or other data communication environment. U.S. patents identified under issued U.S. Pat. Nos. 5,879,173, 5,864,468, 5,734,558, 5,717,533, and U.S. Pat. No. Re 36,820, originally assigned to Methode Electronics, Inc, and now assigned to Stratos Lightwave, both in Chicago, Ill., disclose pluggable transceiver modules. Applicants hereby incorporate by reference U.S. Pat. Nos. 5,879, 173, 5,864,468, 5,734,558, 5,717,533, and U.S. Pat. No. Re 36,820.

It is desirable to miniaturize transceivers in order to increase the port density associated with the network connection (switch boxes, cabling patch panels, wiring closets, computer I/O, etc.). Various standards are known that define form factors for miniaturized electronic devices, such as the Small Form-Factor Pluggable (SFP) standard that specifies an enclosure 9.8 millimeters in height by 13.5 millimeters in width and having a minimum of 20 electrical input/output connections. The specific standards for SFP transceivers are set forth in the "Small Form-Factor Pluggable (SFP) Transceiver Multisource Agreement (MSA)," dated Sep. 14, 2000, which Applicants hereby incorporate by reference.

In order to maximize the available number of transceivers per area, multiple SFP transceivers modules are generally arranged in rows and columns. Each SFP transceiver module is plugged into a socket or receptacle. These sockets or receptacles are generally stacked to maximize the number of available transceiver modules per allotted area. In such stacked configurations, a release mechanism is necessary to remove a transceiver module from within a receptacle. The release member generally is located on the bottom and embedded behind the face of the transceiver module. A special tool or probe must be inserted into a small slit on an external face of the transceiver module in order to access and depress the release mechanism. The requirement of a tool for removing the transceiver module is not only inconvenient, but also prevents an operator from removing a transceiver module if he or she does not have a tool at the appropriate time. The requirement of a tool results in increased installation cost and/or repair time.

Accordingly, there is a need for a pluggable transceiver module having a release mechanism that is easily accessible to an operator and does not require any tools to operate.

OBJECTS AND SUMMARY OF THE INVENTION

In view of the foregoing, it is an object of the present invention to provide a release mechanism for a transceiver module that does not require a tool to operate.

A second object of the present invention is to provide an easily operable release mechanism at minimal cost.

A third object of the present invention is to provide a lever that functions as both a release and a removal mechanism.

Another object of the present invention is to provide a release and removal mechanism that can be operated by a thumb and index finger.

A further object of the present invention is to provide a release and removal mechanism that can be easily assembled.

An additional object of the present invention is to provide a release and removal mechanism for a transceiver module that does not increase the overall height and width of the transceiver module.

According to the present invention, a pluggable transceiver module is provided having a housing with a first side and a face substantially perpendicular to the first side, and a tab extending beyond the surface of the first side, and the tab sized to mate with a slot in a receptacle of a host device for receiving the pluggable transceiver module housing, an elongated member slidably mounted to the first side of the housing and having an internal end and an external end, a wedge on the internal end of the elongated member, wherein sliding the elongated member inward causes the wedge to slide between the tab and the slot on the receptacle and remove the tab from within the slot, thereby releasing the pluggable transceiver module from the receptacle, and a lever rotatably mounted via an axle proximate the face of the pluggable transceiver module, said axle being connected to the external end of the elongated member such that rotating the lever away from the face of the pluggable transceiver cause the rotating axle to push the elongated member inward and drive the wedge between the tab and the slot in order to release the pluggable transceiver module from the receptacle.

BRIEF DESCRIPTION OF THE DRAWINGS

FIG. 2A is a perspective view of the pluggable transceiver module shown in FIG. 1 removed from the receptacle shown in FIG. 1;

FIG. 2B is a perspective view of the pluggable transceiver module shown in FIG. 2A viewed from a different angle;

DETAILED DESCRIPTION OF THE PRESENTLY PREFERRED EMBODIMENTS

Figure 1:
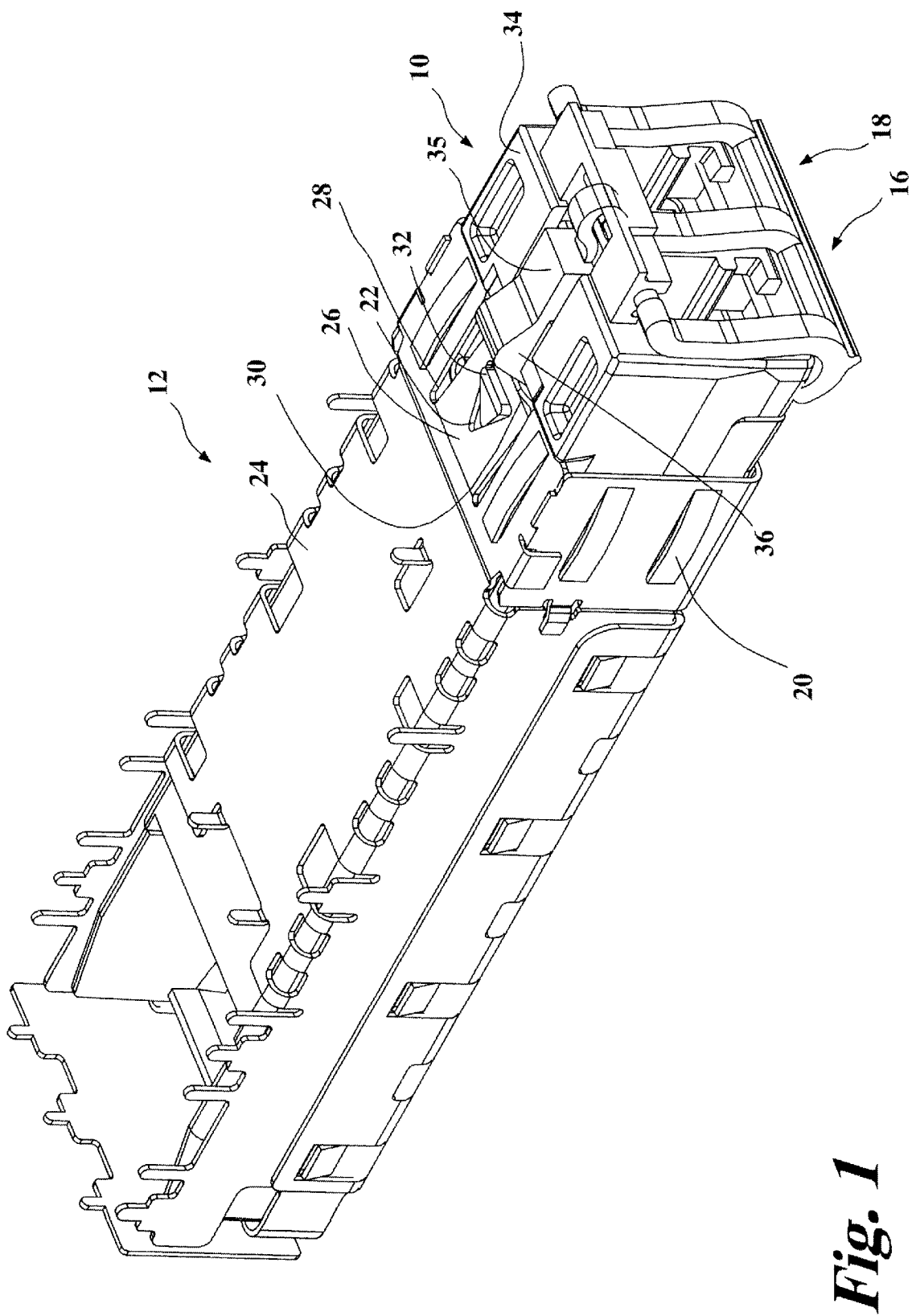
FIG. 1 is a perspective view of a receptacle and a pluggable transceiver module inserted therein in accordance with the present invention.

Referring now to the drawings, FIG. 1 shows a pluggable transceiver module 10 within a socket or receptacle 12. The receptacle 12 is generally to be mounted to a printed circuit board (not shown). The pluggable transceiver module 10 is shown inserted within the receptacle 12. The pluggable transceiver module 10 includes an optical input 16 and an optical output 18. In some configurations, both ports 16,18 can be receivers or transmitters. Contacts 20 are cut and formed out of the receptacle 12. The contacts 20 are designed to contact and ground the receptacle 12 to a stacked array (not shown). The receptacle 12 is preferably constructed out of a conductive metal.

The receptacle 12 includes a slot 22 on a base 24 of the receptacle 12. The slot 22 is formed in a bendable portion 26 of the base 24. The bendable portion 26 is formed by cutting slits 28 (FIG. 4) into the base 24 of the receptacle 12. The bendable portion 26 includes a lip 30. During insertion of the transceiver module 10 into the receptacle 12, a tab 32 on a first side 34 of the transceiver module 10 slides under the lip 30 on the bendable portion 26. The tab 32 includes an inclined surface 33 (FIG. 4) in order to more easily slide under the lip 30 during insertion of the transceiver module 10 into the receptacle 12. When the tab 32 is inserted past the lip 30, the tab 32 will eventually enter the slot 22 in the bendable portion 26, securing the pluggable transceiver module 10 within the receptacle 12. The tab 32 and the slot 22 are preferably triangular in shape and sized to mate closely, thus preventing movement of the pluggable transceiver module 10 within the receptacle 12.

In order to remove the pluggable transceiver module 10 from the receptacle 12, an elongated member 35 including a wedge 36 slides under the lip 30 of the bendable portion 26. The wedge 36 separates the tab 32 from within the slot 22, thus unlocking the transceiver module 10 from the receptacle 12. The wedge 36 is forced between the tab 32 and the slot 22 by sliding the elongated member 35 towards and under the lip 30 of the bendable portion 26. When the wedge 36 slides under the lip 30 and forces apart the tab 32 from the slot 22, the pluggable transceiver module 10 is unlocked and released from the receptacle 12.

The elongated member 35 is slidably mounted to the first side 34 of the pluggable transceiver module 10. The elongated member 35 is located within a slit 40 in a face 42 of the transceiver module 10. The face 42 is perpendicular to the first side 34 of the transceiver module 10. The elongated member 35 slides back and forth within the slot 40 (FIG. 4) on the face 42 (FIG. 4) of the transceiver module 10.

In accordance with the present invention, a lever is rotatably mounted proximate to the face of the pluggable transceiver module. A hinge connects the external end of the elongated member to the axle of the lever, such that the hinge pushes the elongated member inwards as the lever is rotated outward and extended. As the elongated member slides inward, a wedge on the internal end of the elongated member slides between a tab and slot locking mechanism, thus releasing the pluggable transceiver from the receptacle. Furthermore, the extended lever provides a handle to grasp and pull the locked transceiver module from the receptacle. The hinge is preferably a living hinge comprising a flexible member that connects the external end of the elongated member to the axle of the lever, thus driving the elongated member inward as the lever is extended and rotated outward.

FIGS. 2A and 2B illustrate a top and bottom view of the transceiver module 10 outside the receptacle 12. The first side or top 34 of the transceiver module 10 is clearly shown in FIG. 2A. The bottom or second side 37 of the transceiver module is clearly shown in FIG. 2B.

Figure 3A:
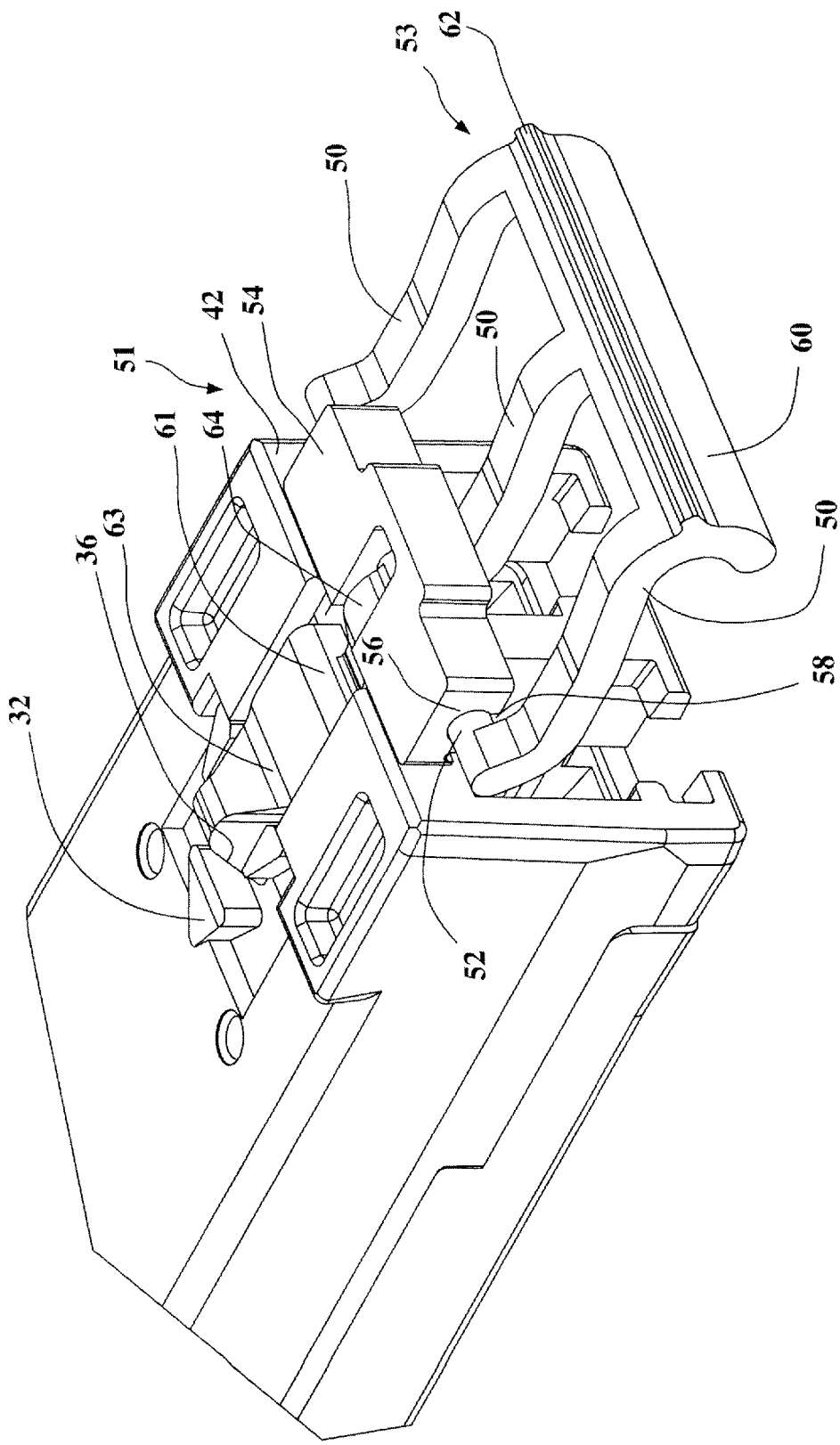
FIG. 3A is an enlarged view of the release and removal lever of the pluggable transceiver module shown in FIG. 2A.
Figure 3B:
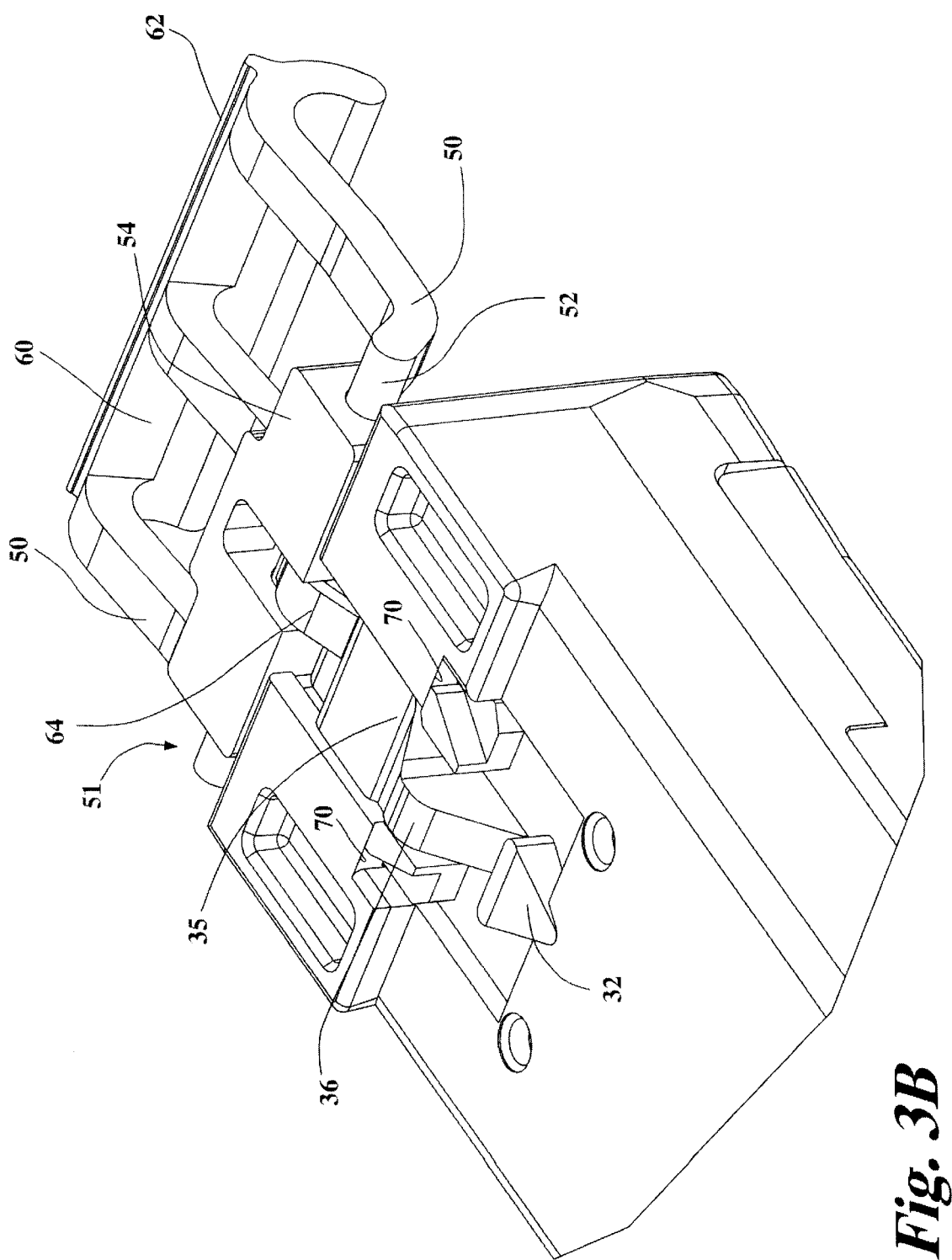
FIG. 3B is an enlarged view of the release and removal lever of the pluggable transceiver module shown in FIG. 2A from a different angle.

FIGS. 3A and 3B show an enlarged view of the hinge 51 of the transceiver module 10. FIG. 3B shows the same hinge 51 from a different angle. In accordance with the invention, a lever or bail 50 is rotatably mounted proximate to the face 42 via a shaft 52. The hinge 51 comprises an axle or shaft 52, a base 54, and the lever 50. The shaft 52 is rotatably mounted within the base 54 of the hinge 51. The base 54 includes a round groove or trough 56 for rotatably mounting the shaft 52 of the lever 50. An opening 58 in the trough 56 enables the shaft 52 to be easily snapped into place during assembly.

In the preferred embodiment, multiple levers 50 are rotatably mounted to the axle 52. The free end 53 of the levers 50 are connected by a cross-arm 60. The cross-arm 60 includes a ridge 62 to enable an operator to more easily grasp the cross-arm 60, and then rotate and extend the levers 50. The hinge 51 and the base 54 are preferably constructed of a polymer, such as plastic. The levers 50 are shown in the extended position in FIGS. 3A and 3B.

The flexible member 64 is connected to the axle 52 and the external end slidable member 35. The internal end 63 of the slidable member includes the wedge 36. In this manner, the flexible member 64 drives the slidable member 35 inward as the levers 50 are rotated outward and the axle 52 is rotated. This action drives the wedge 36 between the bendable member 26 and the tab 32, thus releasing the pluggable transceiver module 10 from the receptacle 12. Preferably the slidable member 35, the flexible member 64, the axle 52, the levers 50, and the cross-arm 60 are constructed or molded as a single element or part.

Figure 4:
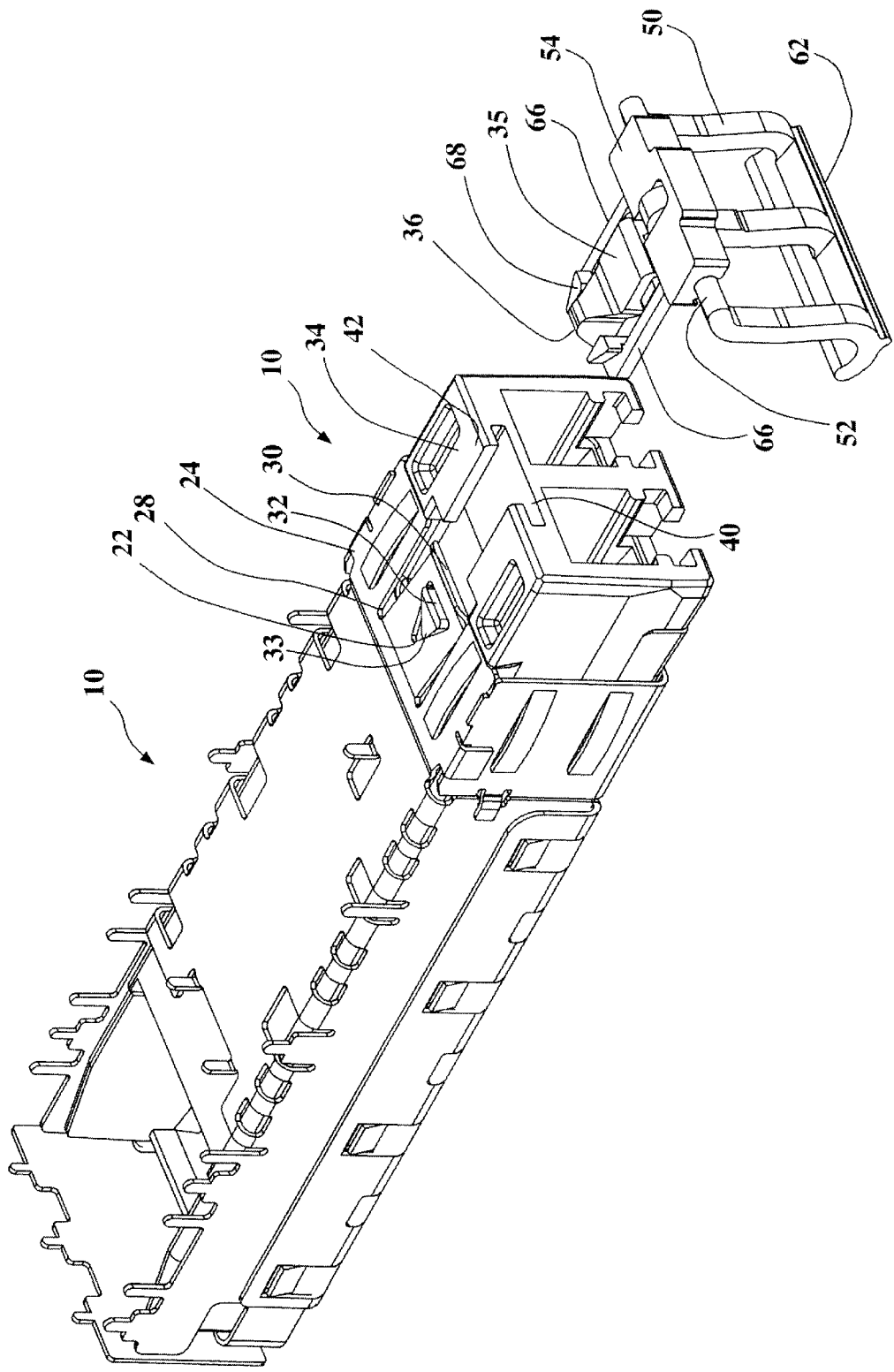
FIG. 4 is an exploded view of the receptacle and pluggable transceiver module shown in FIG. 1.

FIG. 4 illustrates the hinge 51, base 54, and slidable member 35 separated from the face 42 of the transceiver module 10. FIG. 4 shows a clip 66 attached to the base 54. The clip 66 enables the base 54 to be mounted to the face 42 of the module 10 by sliding the clip 66 into the slot 40. The clip 66 includes slanted edges 68 (FIGS. 3B and 5) that enable the clip 66 to be easily compressed upon insertion into the slot 40. The slanted edges 68 then expand after being completely inserted into the slot 40 and grasp onto the edges 70 (FIG. 3B) opposite the face 42. In this manner, the base 54 is easily mounted and locked into position.

Figure 5:
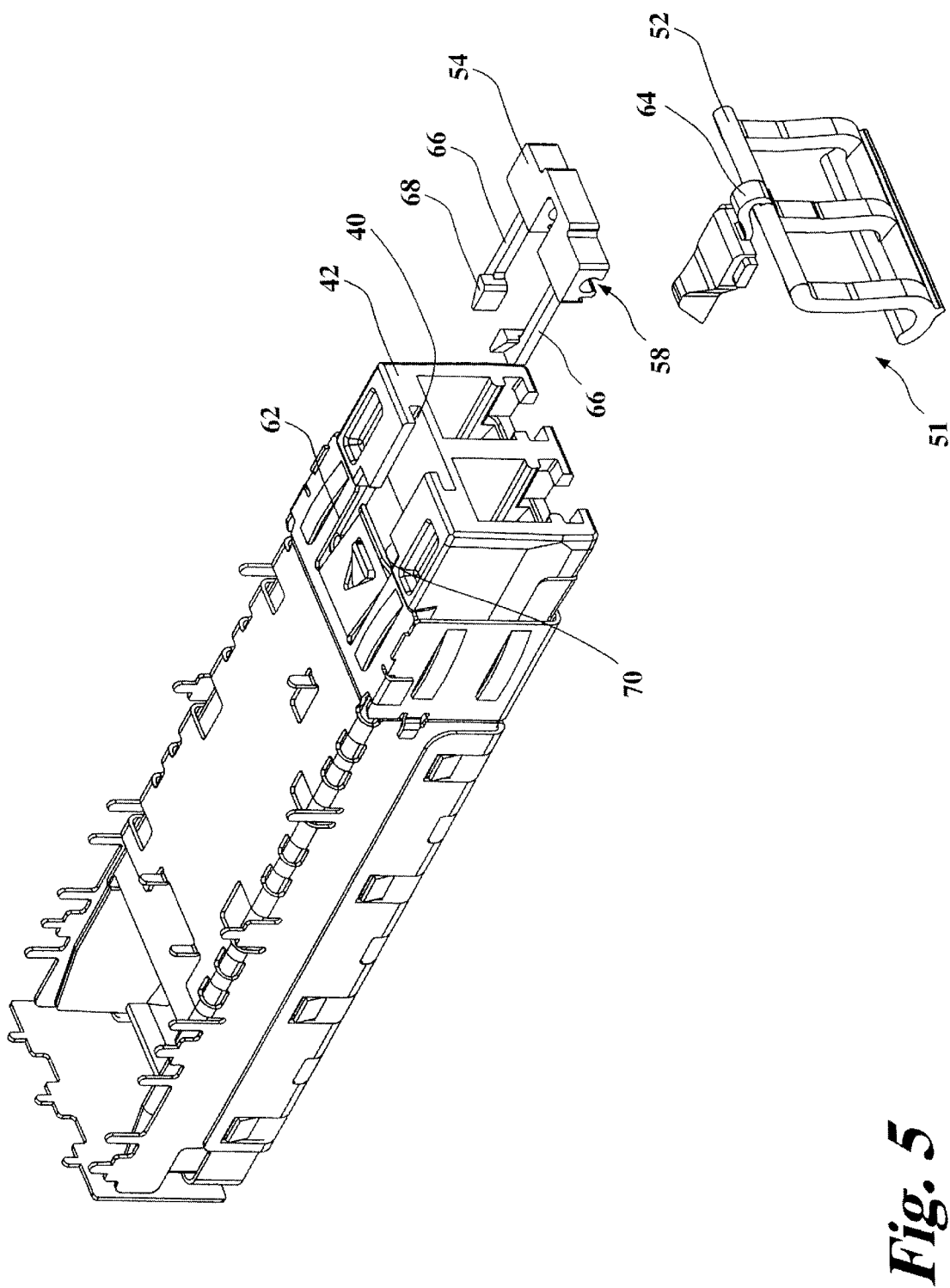
FIG. 5 is a further exploded view of the receptacle and pluggable transceiver module shown in FIG. 1.

FIG. 5 illustrates the living hinge 51 and base 54 as separate components. In the preferred embodiment, the living hinge 51 and base 54 are molded as complete, individual components. As shown in FIG. 5, the axle 52 of the living hinge 51 is easily snapped into the opening 58 of the base 54. The base 54 is then mounted to the face 42 of the module 10 by sliding the clip 66 into the slot 40. After the clip 66 is completely inserted, the slanted edges 68 of the clip 66 expand and grasp against the edges 70 of the module 10, thus locking the base 54 into position.

It is to be understood that the foregoing description is merely a disclosure of particular embodiments and is no way intended to limit the scope of the invention. Other possible modifications will be apparent to those skilled in the art and all modifications are to be defined by the following claims.

We claim:

1. A pluggable transceiver module, comprising:
   a housing having a first side and a face substantially perpendicular to the first side, and a tab extending beyond the surface of the first side, and the tab sized to mate with a slot in a receptacle of a host device for receiving the pluggable transceiver module housing;
   a member slidably mounted to the first side of the housing and having an internal end and an external end;
   a wedge on the internal end of the member, wherein sliding the member inward causes the wedge to slide between the tab and the slot on the receptacle and remove the tab from within the slot, thereby releasing the pluggable transceiver module from the receptacle; and
   a lever rotatably mounted via an axle proximate to the face of the pluggable transceiver module, said axle be connected to the external end of the member such that rotating the lever away from the face of the pluggable transceiver cause the rotating axle to push the member inward and drive the wedge between the tab and the slot in order to release the pluggable transceiver module from the receptacle.

2. The pluggable transceiver of claim 1, further comprising:

a cross-bar on a free end of the lever.

3. The pluggable transceiver of claim 2, further comprising:

a ridge on and parallel to the cross-bar.

4. The pluggable transceiver module of claim 1, wherein the lever is pulled away from the face of the pluggable transceiver module in order to release the pluggable transceiver module from a receptacle.

5. The pluggable transceiver module of claim 1, further comprising:

a receptacle for receiving the pluggable transceiver module, the receptacle having a base including the slot for receiving the tab, whereby the first side of the pluggable transceiver module slides along the base during insertion of the pluggable transceiver module into the receptacle, and the tab enters the slot in order to secure the pluggable transceiver module within the receptacle.

6. The pluggable transceiver module of claim 1, wherein the tab is triangular in shape.

7. The pluggable transceiver module of claim 1, wherein the axle is connected to the external end of the member via a flexible member.

8. The pluggable transceiver module of claim 1, wherein the axle is connected to the external end of the member via a hinge.

9. The pluggable transceiver module of claim 1, wherein the axle is connected to the external end of the member via a living hinge.

10. The pluggable transceiver module of claim 1, wherein the member is slidably mounted within a slit on the first side of the pluggable transceiver module.

11. The connector module of claim 1, further comprising:

an optical input socket and an optical output socket.

12. The connector of claim 1, wherein the member is elongated between the internal end and the external end.

13. A pluggable transceiver module and receptacle, comprising:

a receptacle of a host device for receiving a pluggable transceiver module, the receptacle having a base including a slot for receiving a tab of a pluggable transceiver module during insertion into the receptacle;

a pluggable transceiver module having a housing with a first side and a face perpendicular to the first side, a tab extending beyond the surface of the first side, and the tab sized to mate with the slot in the receptacle, wherein the first side of the pluggable transceiver module slides along the base during insertion of the pluggable transceiver module into the receptacle, and the tab enters the slot in order to secure the pluggable transceiver module within the receptacle;

a member slidably mounted on the first side of the housing having an internal end and an external end;

a wedge on the internal end of the member, wherein sliding the member causes the wedge to slide between the tab and the slot on the receptacle and remove the tab from within the slot, thereby releasing the pluggable transceiver module from the receptacle; and a lever rotatably mounted via an axle proximate the face of the pluggable transceiver module, said axle be connected to the external end of the member such that rotating the lever away from the face of the pluggable transceiver cause the rotating axle to push the member inward and drive the wedge between the tab and the slot in order to release the pluggable transceiver module from the receptacle.

14. A pluggable transceiver module, comprising:

a pluggable transceiver module having a housing with a first side and a face perpendicular to the first side, a tab extending beyond the surface of the first side, and the tab sized to mate with a slot in a receptacle, wherein the first side of the pluggable transceiver module slides along a base of the receptacle during insertion of the pluggable transceiver module into the receptacle, and the tab enters a slot in the base of the receptacle in order to secure the pluggable transceiver module within the receptacle;

an elongated member slidably mounted on the first side of the pluggable transceiver module proximate the tab, the elongated member having an internal end and an external end;

a wedge on the internal end of the elongated member, wherein pushing the elongated member inward causes the wedge to slide between the tab and the slot on the receptacle and remove the tab from within the slot, thereby releasing the transceiver module from the receptacle;

a knob mounted to the external end of the elongated member, the knob including a recess that enables a person to at least partially insert a fingernail to easily grip and remove the pluggable transceiver module from the receptacle; and a ridge formed at a juncture between the external end of the member and the knob, wherein the ridge also enables a person to grip and remove the pluggable transceiver module from the receptacle.

* * * * *